United States Patent
Shannir

(10) Patent No.: US 9,936,065 B2
(45) Date of Patent: Apr. 3, 2018

(54) SELECTIVELY LIMITING A NON-VEHICLE USER INPUT SOURCE OF A HANDHELD MOBILE DEVICE

(71) Applicant: Toyota Motor Engineering & Manufacturing North America, Inc., Erlanger, KY (US)

(72) Inventor: Steven H. Shannir, Dearborn, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/230,621

(22) Filed: Aug. 8, 2016

(65) Prior Publication Data

US 2018/0041628 A1 Feb. 8, 2018

(51) Int. Cl.
- *H04M 3/00* (2006.01)
- *H04M 1/725* (2006.01)
- *H04L 29/08* (2006.01)
- *G06N 7/00* (2006.01)
- *B60R 16/037* (2006.01)

(52) U.S. Cl.
CPC ....... *H04M 1/72577* (2013.01); *B60R 16/037* (2013.01); *G06N 7/005* (2013.01); *H04L 67/12* (2013.01)

(58) Field of Classification Search
CPC . H04M 1/72577; B60R 16/037; G06N 7/005; H04L 67/12
USPC .......................................... 455/419
See application file for complete search history.

(56) References Cited

U.S. PATENT DOCUMENTS

| | | | | |
|---|---|---|---|---|
| 5,835,064 A * | 11/1998 | Gomez | ................ | H01Q 1/242 343/702 |
| 8,989,954 B1 * | 3/2015 | Addepalli | ............ | H04W 4/046 370/328 |
| 9,283,931 B2 * | 3/2016 | Skelton | .................... | B60R 25/00 |
| 9,317,983 B2 * | 4/2016 | Ricci | ..................... | H04W 4/046 |
| 9,408,070 B2 * | 8/2016 | Altbaum | ............... | H04W 8/245 |
| 9,466,161 B2 * | 10/2016 | Ricci | ..................... | G06Q 30/012 |
| 9,545,930 B2 * | 1/2017 | Ricci | .................. | G01C 21/3484 |
| 2013/0103236 A1 | 4/2013 | Mehrgan | | |
| 2013/0145360 A1 * | 6/2013 | Ricci | ........................ | G06F 9/54 717/174 |
| 2014/0309863 A1 * | 10/2014 | Ricci | .................. | G01C 21/3484 701/36 |

(Continued)

OTHER PUBLICATIONS

Welch, "This Honda concept replaces the car's head unit with a smartphone", The Verge, Feb. 23, 2016, 3 pages.

(Continued)

*Primary Examiner* — Marceau Milord
(74) *Attorney, Agent, or Firm* — Christopher G. Darrow; Darrow Mustafa PC

(57) ABSTRACT

A method and device for selectively limiting a non-vehicle user input source of a non-OEM handheld mobile device are disclosed. Upon sensing a docking of the non-OEM handheld mobile device with a vehicle network, and determines a vehicle state level based on vehicle sensor data. When the vehicle state level indicates an increase in the likelihood of operator distraction, a touch block command for the non-OEM handheld mobile device is retrieved and transmitted via the vehicle network. The touch block command operates to block a non-vehicle user input source of the non-OEM handheld mobile device.

20 Claims, 7 Drawing Sheets

(56) References Cited

U.S. PATENT DOCUMENTS

| | | | | |
|---|---|---|---|---|
| 2014/0310788 | A1* | 10/2014 | Ricci | B60Q 1/00 |
| | | | | 726/6 |
| 2015/0039877 | A1* | 2/2015 | Hall | G06F 1/32 |
| | | | | 713/2 |
| 2015/0061895 | A1* | 3/2015 | Ricci | H04W 4/22 |
| | | | | 340/902 |
| 2015/0210291 | A1 | 7/2015 | Hutten-Czapski | |
| 2015/0232065 | A1* | 8/2015 | Ricci | B60R 25/01 |
| | | | | 701/36 |
| 2016/0250985 | A1* | 9/2016 | Ricci | B60R 16/0373 |
| 2016/0313730 | A1* | 10/2016 | Ricci | G05D 1/0027 |
| 2016/0318467 | A1* | 11/2016 | Ricci | B60R 16/037 |
| 2016/0318524 | A1* | 11/2016 | Ricci | B60W 50/10 |
| 2016/0321848 | A1* | 11/2016 | Ricci | G07C 9/00158 |
| 2017/0067747 | A1* | 3/2017 | Ricci | G01C 21/3415 |

OTHER PUBLICATIONS youtube.com, "DrivemodeCar 2.0 Demo", Retrieved from the Internet: <https://www.youtube.com/watch?v=WhMdAmSJfJQ>, Retrieved Jun. 7, 2016, Published Feb. 12, 2016, 1 page.

youtube.com, "Drivemode with Wireless Remote Controller", Retrieved from the Internet <https://www.youtube.com/watch?v=D3vUVOPhYuQ>, Retrieved Jun. 7, 2016, Published Jan. 13, 2016, 1 page.

\* cited by examiner

SELECTIVELY LIMITING A NON-VEHICLE USER INPUT SOURCE OF A HANDHELD MOBILE DEVICE

BACKGROUND

Vehicles have been incorporating technological advances, including implementation of controller devices for improving vehicle performance, such as fuel economy, ride characteristics, driver-assist features, etc. Although vehicles have been improving with the technological advances, including in-vehicle infotainment, personal electronic devices such as smartphones, tablets, phablets, etc., have also experienced technological advances, providing consumer demand for portable communication and infotainment features. It is desirable that personal electronic devices be available for vehicle infotainment use, and be interoperable with existing vehicle human-machine interface devices, however, it is also desirable to not increase a likelihood that an operator may be distracted while operating a vehicle.

SUMMARY

A device and method for selectively limiting a user input source of a non-original equipment manufacturer (OEM) handheld mobile device are disclosed.

In one implementation, a method for selectively limiting a user input source of a non-OEM handheld mobile device is disclosed. The method senses a docking of the non-OEM handheld mobile device with a vehicle network. The method determines a vehicle state level based on vehicle sensor data, and when the vehicle state level indicates an increase in a likelihood of operator distraction, a touch block command for the non-OEM handheld mobile device is retrieved and transmitted via the vehicle network. The touch block command operates to block a non-vehicle user input source of the non-OEM handheld mobile device.

In another implementation, a human machine interface (HMI) control unit is disclosed. The HMI control unit including a wireless communication interface, a processor, and a memory. The wireless communication services communication with a vehicle network. The processor is coupled to the wireless communication interface, and controls operations of the HMI control unit. The memory is coupled to the processor, and is for storing data and program instructions used by the processor, the processor being configured to execute instructions stored in the memory to sense a docking of the non-OEM handheld mobile device with a vehicle network and determine a vehicle state level based on vehicle sensor data accessed via the vehicle network. When the vehicle state level indicates an increase in a likelihood of operator distraction, the processor operates to retrieve a touch block command for the non-OEM handheld mobile device, and transmit the touch block command via the vehicle network. The touch block command operates to block a non-vehicle user input source of the non-OEM handheld mobile device.

BRIEF DESCRIPTION OF THE DRAWINGS

The description makes reference to the accompanying drawings wherein like reference numerals refer to like parts throughout the several views, and wherein.

DETAILED DESCRIPTION

Head unit displays may not be as user-friendly, configurable, or as powerful as user handheld devices. Head unit technology may become outdated over the lifetime of a vehicle. Also, vehicle users may seek to replace their original-equipped head units with tablets, phablets, smart phones, etc., which may be updated with different applications (as selected by a user), including functional apps, gaming apps, audio/visual playback, and the like. When a head unit may become outdated (or may stop working over extended use), a vehicle user generally has the limited alternative of replacing the original device with a third party replacement part.

Unless replacement parts are original equipment manufacturer (OEM) devices, the replacement parts may not have access to the vehicle's human-machine interface (HMI) devices, such as existing HMI devices located on the steering wheel, and generally about the periphery of a head unit device. Because a non-OEM replacement device may not have access to a vehicle's network, the non-OEM replacement device may not be capable of accessing vehicle sensor data or other vehicle inputs.

However, upon docking and/or coupling a non-OEM handheld mobile device, and in effect, replacing a vehicle head unit device, the unintended consequence may be contributing to a likelihood of operator distraction. For example, the apart from the powerful infotainment content that may be accessible by non-OEM handheld mobile devices, interaction with the device's user input sources (such as a touch screen, keyboard, volume keys, soft-keys, navigation, etc.) may further increase a likelihood of operator distraction. The likelihood may also be present whether the vehicle is in an autonomous mode, a driver-assist mode, or driver-control mode.

Accordingly, to avoid contributing to an increase in a likelihood of operator distraction, when a vehicle state level relays an increases of such a likelihood, a HMI control unit may lock and/or touch-block the non-vehicle user input sources of a docked non-OEM handheld device, while limiting input to the vehicle OEM HMI devices accessible by the operator, such as steering wheel switches/buttons, head unit inputs (for example, buttons/switches, eye-tracking, audible command recognition, etc.), environmental control knobs/switches, etc.

Figure 1:
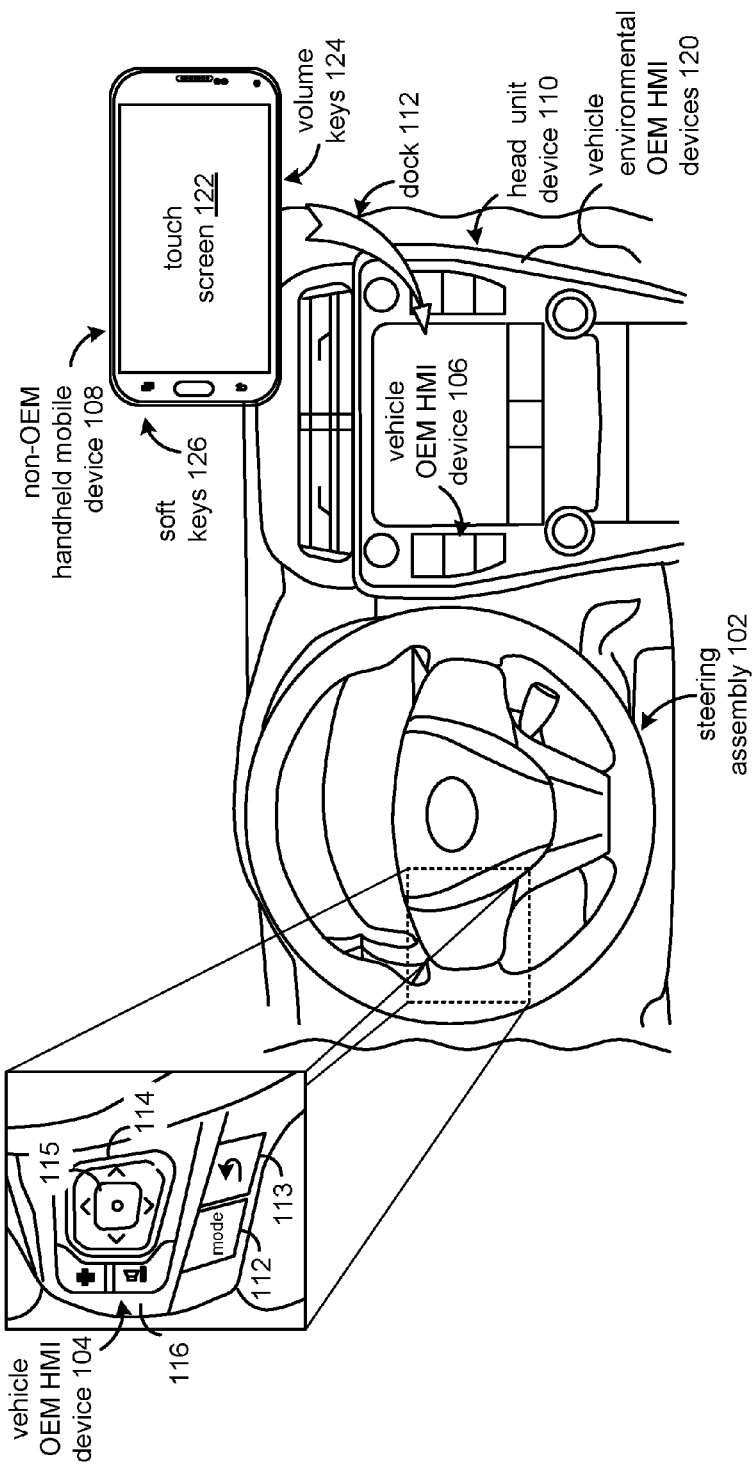
FIG. 1 shows a plan view of a vehicle steering assembly and a non-OEM handheld mobile device docking with a head unit device.

Referring to FIG. 1, a front plan view of a vehicle steering assembly 102 and head unit device 110 is disclosed. The steering assembly 102 may include a vehicle original equipment manufacturer (OEM) human-machine interface (HMI) device 104, which may function to manipulate controls of vehicle devices, such as those of the head unit device 110.

The head unit device 110 may include vehicle OEM HMI device 106, which may function to also manipulate controls of vehicle devices, such as those of the head unit device 110, and may also include vehicle environmental OEM HMI devices 120 for vehicle environmental control, such as driver/passenger temperature settings, blower speed, recirculation setting, temperature sensing display, etc. The vehicle OEM HMI device 106 may include various push button user input devices, as well as other forms of user input, such as visual input via an eye tracking input device 240, which tracks eye gaze for screen input via tracking signals 244. Also, the vehicle OEM HMI device 106 may include a microphone 250, which may receive audible commands 248 that may be converted by a speech recognition to produce user input data 211.

As may be appreciated, in the context of vehicle manufacture, original equipment manufacturer (OEM) devices may generally refer to those parts assembled and installed during new vehicle construction. Various manufacturers may provide these devices to the specifications and requirements of the final vehicle assembly, and may have a relationship with the original vehicle manufacturer, and accordingly, have access to operational and/or functional specifications for device integration.

In contrast, aftermarket, or non-OEM devices, are those produced by manufacturers other than the OEM, which may be installed as replacements after the factory assembly. Non-OEM manufacturers may not, however, have access to the specifications and requirements of the original vehicle manufacturer, and accordingly, non-OEM devices may not have the capacity to integrate with vehicle OEM devices.

With the example of the vehicle OEM HMI device 104, the term human-machine interface (HMI) refers to the manner in which a human, such as a vehicle operator and/or passenger, interacts with a machine, such as a vehicle and/or vehicle components therein. A vehicle, generally, may include numerous HMI devices. These HMI devices may in turn provide components for a vehicle supervisory control and data acquisition (SCADA) system, a distributed control system (DCS), etc., as may be used for vehicle automation and control.

The vehicle OEM HMI device 104 may include vehicle input sources such as volume control toggle inputs 116, a mode button 112, a back switch 113, a cursor switch 114, and enter switch 115. As originally configured, by way of example, the volume control toggle inputs 116 may operate to increase/decrease volume. The mode button 112 may operate to change an audio/video data source (air, satellite, USB files, compact disc, etc.). The back switch 113 may operate to returns a head unit display to a previous screen. The cursor switch 114 may operate to select audio/video data within an source (as may be selected by the mode button 112), such as a radio station, a radio preset, a compact disc track, an audio/visual file, individual songs, etc.

The vehicle OEM HMI device 106 of the head unit device 110 may include similar operations and/or functions with respect to the vehicle OEM HMI device 104, and may be accessible by a passenger of the vehicle, as well as by the vehicle driver. Other examples of user input may be provided by the vehicle OEM HMI device 106, such as visual input via an eye tracking input device 240, which tracks eye gaze for screen input via tracking signals 244. Also, the vehicle OEM HMI device 106 may include a non-vehicle user input sources such as a microphone 250, which may receive audible commands 248 that may be converted by a speech recognition to produce user input data 211.

Referring to the example of FIG. 1, a non-OEM handheld mobile device 108 may replace the display unit of the head unit device 110, and upon arriving at a destination, may be removed and taken with the vehicle user when they exit the vehicle. In effect, the non-OEM handheld mobile device 108 may be docked 112 with a vehicle network, and provide functionality associated with a head unit device 110, as well as provide additional functionality to the non-OEM handheld mobile device 108.

The head unit device 110 may provide a platform various non-OEM handheld mobile devices 108, such as notebook computers, laptop computers, tablets, phablets, and/or smartphone operation in a vehicle, and to further replace OEM head unit devices for the vehicle. The docking platform may mimic a flush and/or planar design of an OEM head unit, while may also provide other configurations, such as an adjustable armature, a vehicle desk or rack platform to permit positioning the non-OEM handheld mobile device 108 in a convenient and ergonomic position. Also, the docking configuration may include aspects that allow a quickly and easily dock and undock the non-OEM handheld mobile device 108. A docking platform may include a docking station to receive and/or cradle the non-OEM handheld mobile device 108.

As another feature, a non-OEM handheld mobile device 108, being portable and configured to interact with first vehicle, may also be used with license and/or access permissions to provide similar infotainment and device app functionality in other vehicles of similar vehicle manufacturers, and may also in dissimilar vehicle manufacturers (across vehicle brands, as well as across passenger or non-passenger vehicles such as, for example, a terrestrial, aquatic, and/or airborne vehicle.

Also, as may be appreciated by one of skill in the art, a non-OEM handheld mobile device 108 may provide additional function and configuration capabilities over those that may be present in an OEM head unit device 110.

The non-OEM handheld mobile device 108 may be a third-party device, such as a smartphone, tablet, phablet (that is, smartphone having a screen of intermediate size between a smartphone and a tablet computer), etc. Non-OEM handheld mobile devices may provide expanded functionality such as always-listening function for voice commands, active display functions for illuminating individual pixels for new notifications (e.g., email, text, updates, etc.), location-based reminder functionality, etc.

Operational features of a non-OEM handheld mobile device 108 may include a megapixel camera with high-definition (HD) video capture, high-definition (HD) output to an external monitor (or to the device display), FM radio capability, music file player capability, digital living network alliance (DLNA) support for media sharing.

The operational features of the non-OEM handheld mobile device 108 may be operated by non-vehicle user input sources, such as a touch screen 122, keyboard, volume keys 124, soft-keys 126, app-specific screen inputs, etc.

With respect to wireless communication, the device 108 may include cellular voice/data capability under various communications standards specifications. wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, Near Field Communication (NFC), IEEE 802.11, Bluetooth, AMPS (advanced mobile phone services), digital AMPS, GSM (global system for mobile communications), CDMA (code division multiple access), LMDS (local multipoint distribution systems), MMDS (multi-channel-multi-point distribution systems), IrDA, Wireless USB, Z-Wave, ZigBee, and/or variations thereof.

Head unit device 110 of a vehicle may be modified to physically receive and facilitate docking 112 of a non-OEM handheld mobile device 108, and may couple the non-OEM handheld mobile device 108 to couple with a vehicle network on a wired and/or wireless basis, and may further interoperate with vehicle OEM HMI devices, such as the vehicle OEM HMI device 104, the vehicle OEM HMI device 106, vehicle environmental OEM HMI devices 120, and other OEM HMI devices of a vehicle, as is discussed in detail with reference to FIGS. 2-6.

Figure 2:
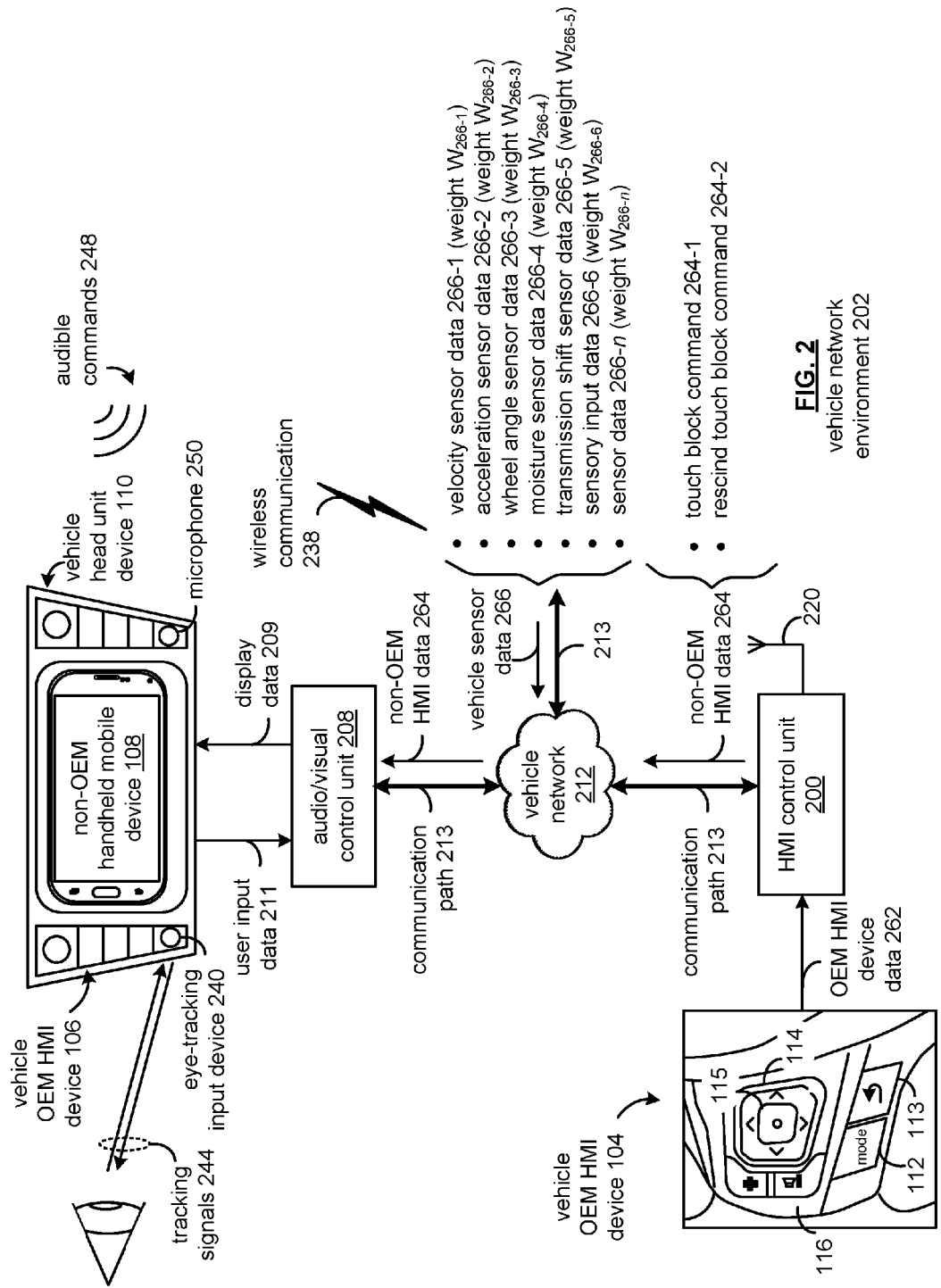
FIG. 2 shows an example of a block diagram of a human-machine interface (HMI) control unit in the context of a vehicle network environment.

Referring now to FIG. 2, provided is an example of a block diagram of the human-machine interface (HMI) control unit 200 in the context of a vehicle network environment 202. While the HMI control unit 200 is depicted in abstract with other vehicular components, the HMI control unit 200 may be combined with other system components of a vehicle.

The vehicle network environment 202 may include the HMI control unit 200 and an audio/visual control unit 208. Other examples of control units may generally include powertrain (such as engine, transmission, shaft, wheels, etc.), chassis (internal powertrain support, and brakes, steering, suspension, etc.), body-and-comfort (such as heating, air-conditioning, seat controls, window control, lights, etc.), driver assistance (such as in-vehicle navigation, cruise control, assisted parking and/or driving, autonomous driving, etc.), and the like.

The HMI control unit 200 may operate to facilitate interaction between humans and vehicle electronics. The HMI control unit 200 may operate to present information from vehicle devices and external devices in user-friendly and usable manner, permitting a driver and/or passenger to control the vehicle operations and infotainment system.

The HMI control 200 may couple to external devices via Bluetooth, Wi-Fi, and/or cellular networks, and may provide system diagnoses from vehicle sensor data 266, and otherwise be communicatively coupled to other vehicle control units, and may visually display information to a vehicle user via the non-OEM handheld mobile device 108 via the audio/visual control unit 208.

Control units communicatively coupled via a network 212 and communication paths 213. The HMI control unit 200 may communicate with a head unit device 110 via a communication path 213 and network 212, and may also communicate with a sensor control unit (not shown) to access vehicle sensor data 266.

The HMI control unit 200 may also be wirelessly docked with the non-OEM handheld mobile device 108 via the antenna 220 and wireless communication 238, as well as via a wireless communication generally to other handheld mobile devices (for example, cell phone, a smart phone, a personal digital assistant (PDA) devices, tablet computer, e-readers, etc.).

In this manner, the HMI control unit 200 operates to receive input data, such as OEM HMI device data 262, and in turn provide non-OEM HMI data 264, to the head unit device 110 via the audio/visual control unit 208. As may be appreciated, the HMI control unit 200 may also operate to provide non-OEM HMI data 264 to other devices that may communicatively couple via the network 212 on a wireless and/or wired basis.

Still referring to FIG. 2, the audio/visual control unit 208 operates to provide, for example, audio/visual data 209 for display, which in the present example is the non-OEM handheld mobile device 108, which operates to provide display functions for the head unit device 110.

The audio/visual data 209 and input data 211 may include audio data, hands-free phone data, voice control data, navigation data, USB connection data, DVD play function data, multifunction meter function data, illumination signal data for the display 306 (such as dimming control), driving status recognition data (such as vehicle speed, reverse, etc. via vehicle sensor data 266), composite image signal data (such as via LiDAR sensor devices, cameras, etc.).

The input data 211 may be received by the OEM HMI device 106 through various push button user input devices, as well as other forms of user input. Examples of other input include visual input via an eye tracking input device 240, which tracks eye gaze for screen input via tracking signals 244. Also, the vehicle OEM HMI device 106 may include a microphone 250, which may receive audible commands 248 that may be converted by a speech recognition to produce user input data 211. The user input data 211, may be similarly converted and/or mapped to non-OEM HMI data 264 to affect operation of the non-OEM handheld mobile device 108. As may be further appreciated, non-OEM HMI data 264 may be provided via the user input data 211 by suitable touch screen technologies, for example, as a resistive touch screen, a surface acoustic wave touch screen, a capacitive touch screen, a surface capacitance touch screen, etc.

A touch screen 122 of the device 108 operates to provide visual output or graphic user interfaces such as, for example, maps, navigation, entertainment, information, infotainment, and/or combinations thereof. The touch screen 122 of the device 108 may include mediums capable of transmitting an optical and/or visual output such as, for example, a cathode ray tube, light emitting diodes, a liquid crystal display, a plasma display, or other two dimensional or three dimensional display that displays graphics, text or video in either monochrome or color in response to display data 209.

The head unit device 110 may also include tactile input and/or control inputs through the vehicle OEM HMI device 106 such that the communication path 213 communicatively couples the tactile input to other control units and/or modules of the vehicle. The user input data 211 may provided by devices capable of transforming mechanical, optical, or electrical signals into a data signal capable of being transmitted via the communication path 213.

The tactile input via the touch screen 122 (see FIG. 1) of the non-OEM handheld mobile device 108 may include number of movable objects that each transform physical motion into a data signal that can be transmitted over the communication path 213 such as, for example, a button, a switch, a knob, a microphone, etc., for generating a HMI functional mapping assignment that corresponds with the user capability of the OEM HMI device 104, by way of example. Similar mappings may be generated with respect to other OEM HMI devices, such as device 106, 120, and the like.

The non-OEM handheld mobile device 108 may also operate to provide information regarding vehicle operation conditions based on display data 209 from the audio/visual control unit 208. Moreover, the graphics-based instrument cluster display, or may provide a such instrument cluster display to other monitor devices for the vehicle, such as a heads-up display (not shown), or to an instrument cluster in the vehicle dash assembly behind the vehicle steering wheel.

As may be appreciated, the communication path 213 of the vehicle network environment 202 may be formed by a medium suitable for transmitting a signal such as, for example, conductive wires, conductive traces, optical waveguides, or the like. Moreover, the communication paths 213 can be formed from a combination of mediums capable of transmitting signals.

The communication path 213 may be provided by wired connections, wireless connections and/or a combination thereof. The communication path 213 may include a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle.

As may be further appreciated, the communication path 213 may be provided under other network specifications, such as automotive Ethernet such as those developed under the IEEE 802.3, 802.1 and 1722 working groups, and as may also include audio video bridging over Ethernet (AVB), under IEEE 802.1Qat (Stream Reservation Protocol (SRP), IEEE 802.1Qav (Qav Queuing and Forwarding Protocol), etc.

The wireless communication 238 via the antenna 220 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, ZigBee, and/or variations thereof.

As may be appreciated, the HMI control unit 200 may lock and/or block touch user input to a docked non-OEM handheld device, and limiting input to vehicle OEM HMI devices accessible by the operator, such as steering wheel switches/buttons, head unit inputs (for example, buttons/switches, eye-tracking, audible command recognition, etc.), environmental control knobs/switches, etc.

The vehicle state level may be based on vehicle sensor data 266, which may be collected by corresponding sensor devices positioned throughout the vehicle, including proximal sensor devices, and long-range sensor devices, imaging sensor devices, powertrain sensor devices, engine sensor devices, transmission sensor devices, etc. The vehicle sensor data 266 may include velocity sensor data 266-1 with weight $W_{266-1}$, acceleration sensor data 266-2 with weight $W_{266-2}$, wheel angle sensor data 266-3 with weight $W_{266-3}$, moisture sensor data 266-4 with weight $W_{266-4}$, transmission shift sensor data 266-5 with weight $W_{266-5}$, sensory input data 266-6 with weight $W_{266-6}$, through sensor data 266-$n$ with weight $W_{266-n}$ As may be appreciated, the weights $W_{266-1}$ through $W_{266-n}$ may indicate a different emphasis for each of the vehicle sensor data (such as a velocity magnitude, or a rate of acceleration, degree of wheel angle, etc.).

The vehicle state level operates to indicate whether an increase in a likelihood of operator distraction is present with respect to the vehicle operation. The indication may be assessed against a vehicle state threshold, which may be based on the experience of a vehicle driver/operator, or in the alternative, may default to a lower vehicle state threshold until another configuration may be entered by a vehicle owner. For the purpose of discussion, the vehicle state threshold may default to an indication by the vehicle state level that continuous vehicle movement "increases a likelihood of operator distraction."

For example, when a vehicle is placed into a "drive" (or "reverse") gear, but the vehicle has not started to move, the vehicle status level for the example sensor data 266 would be a weight $W_{266-5}$. For an experienced driver/operator, the vehicle status threshold would not likely be exceeded, though it would for an inexperienced drive/operator. When the vehicle is moving in a straight line, in uncongested traffic, the vehicle status level may be weight $W_{266-5}$, plus weight $W_{266-1}$, and weight $W_{266-2}$. For an experienced driver/operator, the vehicle status threshold would likely be exceeded (as well as for an inexperienced drive/operator).

When the increase in the likelihood of operator distraction is present, the HMI control unit 200 may operate to block touch command functionality of the non-OEM handheld control unit 108.

The capability to block touch command functionality may be desirable in view of a potential to further aggravate driver/operator distraction by replacing of the display portion of the head unit device 110 with a feature-rich (and application-rich) non-OEM handheld mobile device 108, which by nature of its use, operates under touch screen operations (along with tactile inputs, such as volume keys 124, power key, etc.).

As may be appreciated by one of ordinary skill in the art, the non-OEM handheld mobile device 108 provides various applications executable by the platform processor and memory devices. The term "application" may refer to a self-contained program, and/or software designed to fulfill a particular purpose, and may be resident applications (that is, available upon acquisition or purchase of the non-OEM handheld mobile device 108, such as text, email, calendar, bloatware, etc.) and/or downloaded to the non-OEM handheld mobile device 108 via a local area network (such as Wi-Fi under IEEE 802.11, Bluetooth, Near Field Communications, etc.), a wide area network (such as 3GPP (3rd Generation Partnership Project), 4GPP (4th Generation Partnership Project), 5GPP (5th Generation Partnership Project), LTE (long term evolution), LTE Advanced, etc.), and/or via various communications specifications discussed herein.

Applications may provide infotainment functions (such as video, audio, music, multimedia, communication, news, etc.) and business functions (banking functions, connection to a main office, payroll, etc.). The tendency for a driver and/or vehicle operator to access the device 108 via the by non-vehicle user input sources such as touch screen 122 or other inputs 124, 126 (see FIG. 1) that may contribute to operator/driver distraction, that could divert an operator's visual, manual and/or cognitive attention away from the primary task of driving.

The vehicle state threshold may be configured based on the driver abilities in certain driving scenarios because not all driving scenarios may call on the same level of visual, manual and/or cognitive attention.

As may be appreciated by one of skill in the art, whether the vehicle state level may be determined to indicate an increase in a likelihood of operator distraction, may also take into consideration that not all drivers/operators share equivalent experience and capability. Between experienced and less experienced drivers/operators, vehicle status levels may not require the same level of visual, manual and/or cognitive attention. As may be appreciated, the vehicle state may be assessed with respect to a vehicle state threshold.

For example, a more experienced driver and/or operator may not be likely to be distracted under a vehicle state threshold otherwise triggered at lower vehicle speeds (as may be indicated by velocity sensor data 266-1 and/or acceleration sensor data 266-2), or at low levels of traffic congestion (as may be indicated by sensory input data 266-6). Accordingly, a vehicle state threshold may provide an experienced vehicle operator with an ability to interface with the touch screen 122 of the non-OEM handheld device 108 while the vehicle is in motion under certain vehicle operations (such as lower speeds, uncongested areas, etc.).

In contrast, a less experienced driver and/or operator (such as a teen driver, for example) may have a higher "likelihood of operator distraction" at a vehicle state level that may indicate that a vehicle may be in gear or in motion (despite the velocity rate). Accordingly, a vehicle state threshold having a lower tolerance may operate to block or lock-out the non-OEM handheld device 108 when a vehicle state level indicates a vehicle transmission is placed in a "drive" position (such has through transmission shift sensor data 266-5). In effect, the vehicle state threshold indicates a greater "increase in the likelihood of operator distraction" for the less experienced driver.

As may be appreciated by one of skill in the art, the vehicle state level may be configured by the owner of the vehicle, and may further operate to identify the vehicle operator and/or driver based biometric information (such as weight, fingerprint, retina identification via input device 240, voice recognition via audible commands 248, etc.). Also, RFID information may be relayed to the HMI control unit 200, via the antenna 220, relating to the individual in possession of the RFID device (such as a vehicle key fob device).

Generally, for the purpose of discussion, vehicle status level based on vehicle sensor data 266 may indicate continuous vehicle movement to indicate a likelihood of operator distraction, exceeding a vehicle state threshold indicating an "increase in a likelihood of operator distraction." The HMI control unit 200 may retrieve a touch block command for the non-OEM handheld mobile device 108, and transmit the touch block command 264-1 via the vehicle network 212 via a non-OEM HMI data 264. The touch block command operates to block the user interfaces of the non-OEM handheld mobile device 108, and to minimize driver/operator activates that may divert the operator's visual, manual, and/or cognitive attention.

A touch block command 264-1 may operate to execute a touch block application resident with the non-OEM handheld mobile device 108. The touch block application may be loaded by the HMI control unit 200 to the non-OEM handheld mobile device 108. In this regard, the HMI control unit 200 may download a touch block application via the wireless communication 238 of the antenna 220, or may have the touch block application pushed to, or updated, via a software load delivered to the vehicle network environment 202. As may also be appreciated, the HMI control unit 200 may operate to instruct the non-OEM handheld mobile device 108 to access and download a touch block application. As may be further appreciated, the touch block command 264-1 may instruct other control units of the vehicle network environment 202 to recognize none and/or some of user input data 211 produced by the non-OEM handheld mobile device 108, as may be recognized via an applied HMI mapping assignment 316, which is discussed in detail with reference to FIGS. 4-7.

When a vehicle state level no longer indicates an "increase in a likelihood of operator distraction," the HMI control unit 200 may issue a rescind touch block command 264-2 operable to cause the non-OEM handheld mobile device 108 to revert to receiving user input via by non-vehicle user input sources such as the touch screen 122, and/or input sources 124 and 126 (see FIG. 1).

Figure 3:
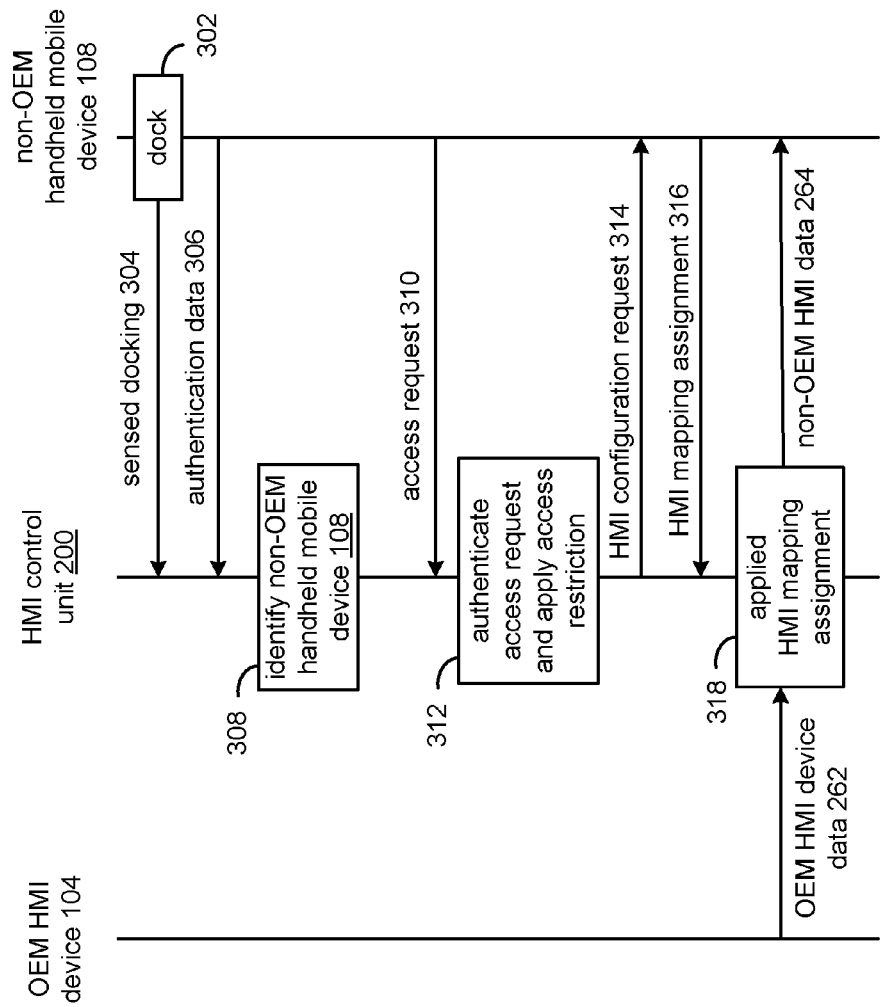
FIG. 3 shows a messaging diagram illustrating a protocol between a non-OEM handheld mobile device and a HMI control unit of FIG. 2.

Referring to FIG. 3, a messaging diagram 300 is illustrated. The messaging diagram shows messaging between HMI control unit 200 and a non-OEM handheld mobile device 108. Based upon the example protocol, interoperability may be provided between an original equipment manufacturer (OEM) human-machine interface (HMI) device 104 and a non-OEM handheld mobile device 108.

Initially, a non-OEM handheld mobile device 108 docks at 302 with the vehicle network 212 and the vehicle network environment 202 (see FIG. 2). The docking may be a wired docking and/or a wireless docking. Examples of wired docking may include physical socket and/or pin receivers for the device 108 to the vehicle network 212, such as through a network interface, through various communication protocols, such as USB, Firewire (IEEE 1394), etc. Examples of a wireless docking may be via the antenna 220 of the HMI control unit 200 (see FIG. 2), through 802.11 communications (and variations thereof), Bluetooth, near-field communications (NFC), etc.

Upon sensing the docking via messaging 304, the HMI control unit receives authentication data 306. The authentication data 306 may serve to identify the non-OEM handheld mobile device 108 at operation 308.

Identification of the device 108 may be provided by retrieving mobile device identification information through the wireless and/or wired docking, and further by a near field communication (NFC) with the non-OEM handheld mobile device 108. The mobile device identification information may be in the form of a mobile station identification (MSID) data, a mobile identification number (MIN) data, an international mobile subscribe identity (IMSI) data, a manufacturer serial number data, etc.

The HMI control unit 200 receives an access request 310, and authenticates the access request 310 as provided by the non-OEM handheld mobile device 108. Upon authentication at 312, the HMI control unit 200 determines an access authority level to vehicle data network, which may be an administrator access authority level (that is, full vehicle network data access, such as for testing at installer and/or vehicle assembly facilities), an owner access authority level (that is, moderate vehicle network data access), and/or a guest access authority level (that is, a low network data access for basic functionality).

As may be appreciated, the access request 310 may include a software license key. The software license key may be provided with an app purchase through the non-OEM handheld mobile device 108. A software license key provides a restricted license to access vehicle data and/or OEM HMI device data. The software license key may operate to provide for OEM HMI device 104 interoperability with a non-OEM handheld mobile device 108. The key may be a combination of the device number (such as identifiers for the non-OEM handheld mobile device 108) and some other information. Because the key is unique to the non-OEM handheld mobile device 108, it may not be transferred and/or used by other mobile devices.

Such access apps may be provided through third-party vendors, which in turn may be authorized resellers by a vehicle manufacture. Such licenses may include a number of seats, or vehicles, that the software license key may access, as well as provide additional services. Examples of additional services may include cloud storage of HMI mapping assignments related to a device 108, such that when the device 108 is relocated to other vehicles, the HMI mapping assignments may be pushed to a vehicle when the non-OEM handheld mobile device deployed.

In operation, the HMI control unit 200 transmits a human-machine interface (HMI) configuration request 314 that corresponds to the desired OEM HMI device, such as device 104, device 106, and/or devices 120.

As may be appreciated, OEM HMI devices of a vehicle may generally be mapped for accessibility and interoperability with the non-OEM handheld mobile device 108. For the example provided, the OEM HMI device 104 is discussed for clarity of the discussion herein.

The HMI configuration request 314 may provide a graphic user interface (GUI) data for display by the non-OEM handheld mobile device. In this example, the representation of the OEM HMI device 104 may be displayed on the non-OEM handheld mobile device 108, in which device inputs may be learned. For example, a volume control toggle input 116 may be graphically correlated with the volume control toggle input of the device 108, etc.

As may also be appreciated, the non-OEM handheld mobile device 108 may provide an HMI mapping assignment 316 with stored GUI data from earlier configuration activity. The non-OEM handheld mobile device 108 may simply confirm the prior stored GUI data to base interoperability with the OEM HMI device. Also, the HMI control unit 200 may provide with the HMI configuration request default GUI data, which may also conform to the non-OEM handheld mobile device 108 for interoperability with the OEM HMI device 104.

As may be appreciated, other functions may be mapped to the GUI representation, such as a display scrolling function applied to the volume control toggle inputs 116 of the OEM HMI device 104.

The available mapping assignments are received by the HMI control unit 200 as a HMI mapping assignment 316. In the HMI mapping assignment 316, functional inputs of the non-OEM handheld mobile device 108 are mapped and/or correlated with the switch inputs of the OEM HMI device 104, which is discussed in further detail with reference to FIG. 4.

With the applied HMI mapping assignment 318, the HMI control unit 200 operates to receive OEM HMI device data 262 from the OEM HMI device 104, and produces non-OEM HMI data 264. The non-OEM HMI data 264 is provided to the device 108, which may be via the audio/visual control unit 208. The functional controls are then applied by the non-OEM handheld mobile device 108.

Figure 4:
FIG. 4 shows an example of an applied HMI mapping assignment applying the OEM HMI device data with the functions of the non-OEM handheld mobile device of FIGS. 1-4.

FIG. 4 illustrates an example of an applied HMI mapping assignment 316 based on the OEM HMI device 104. The applied mapping assignment 316 may be formed upon receiving an HMI mapping assignment 314 from a non-OEM handheld mobile device to provide interoperability with an OEM HMI device, such as devices 104, 106, and/or 120 (see FIG. 1).

As shown in FIG. 4, the applied HMI mapping assignment 316 may include a device field 402, an input field 404, and application fields (such as audio application mode 422, vehicle application mode 424, through application mode nnn). During an HMI configuration, a vehicle user may designate applications that may selected via a mode button 112 of the OEM HMI device 104.

Application features may be controlled via the input fields 404 by the device set out by the device field 402, such as OEM HMI device 104. As an example, volume control toggle inputs 116 may for an audio application mode 422 increase or decrease audio volume within the vehicle. In a vehicle application mode 424, the volume control toggle inputs 116 may scroll the display to access various system information, such as fuel efficiency, tachometer data, speed data, engine temperature, etc.

In this manner, the inputs of the OEM HMI device 104 are provided functional actions, and the HMI control unit 200 may correlate the input data values in the corresponding OEM data field 408. The input data values in the OEM data field 408 are mapped with the non-OEM data values provided in the non-OEM data field 264.

As may be appreciated, the data communication between vehicle devices may be encrypted (such as at a network transfer layer below the application layer, but above the data link layer). Such encryption may further secure the data network from unintentional access, while providing a vehicle user functional operation of a non-OEM handheld mobile device 108 with the OEM HMI device 104.

Figure 5:
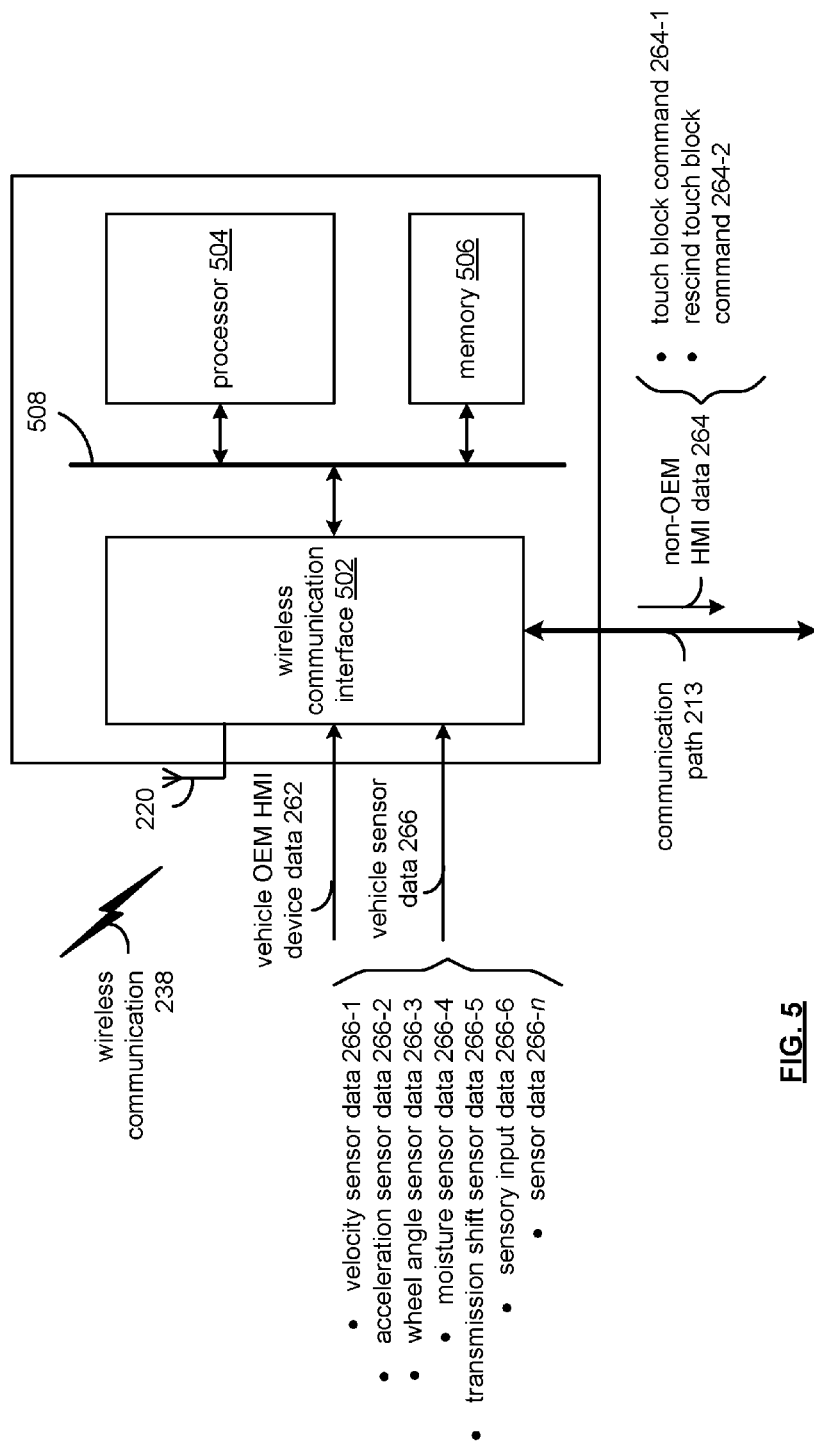
FIG. 5 is a block diagram of a HMI control unit of FIG. 2.

FIG. 5 is a block diagram of a HMI control unit 200, which includes a communication interface 502, a processor 504, and memory 506, that are communicatively coupled via a bus 508.

The processor 504 in the control unit 200 can be a conventional central processing unit or any other type of device, or multiple devices, capable of manipulating or processing information. As may be appreciated, processor 504 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element 506 may be a single memory device, a plurality of memory devices, and/or embedded circuitry of the processing module 404. Such a memory device may be a read-only memory, random access memory, volatile memory, non-volatile memory, static memory, dynamic memory, flash memory, cache memory, and/or any device that stores digital information. The memory 506 is capable of storing machine readable instructions such that the machine readable instructions can be accessed by the processor 504. The machine readable instructions can comprise logic or algorithm(s) written in programming languages, and generations thereof, (e.g., 1GL, 2GL, 3GL, 4GL, or 5GL) such as, for example, machine language that may be directly executed by the processor 504, or assembly language, object-oriented programming (OOP), scripting languages, microcode, etc., that may be compiled or assembled into machine readable instructions and stored on the memory 506. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 504 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 504 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 504 executes, hard coded and/or operational instructions corresponding to at least some of the steps and/or functions illustrated in FIGS. 1-7 to selectively limit a non-vehicle user input source of a non-original equipment manufacturer (OEM) handheld mobile device in view of the features and methods described herein.

The wireless communications interface 502 generally governs and manages the vehicle user input data via the vehicle network 212 over the communication path 213 and/or wireless communication 238. The wireless communication interface 502 also manages controller unit output data such as display data and/or vehicle sensor data 266 to the vehicle user. There is no restriction on the present disclosure operating on any particular hardware arrangement and therefore the basic features herein may be substituted, removed, added to, or otherwise modified for improved hardware and/or firmware arrangements as they may develop.

The HMI control unit 200 operates to determine a vehicle state level based on vehicle sensor data 266 (see FIG. 2), which includes capturing of intensity or reflectivity returns of the environment surrounding the vehicle, instantaneous vehicle speed data, and acceleration data for determining acceleration state. In general, vehicle sensor data 266 captured by the vehicle sensors may be used by one or more of applications of the non-OEM handheld mobile device 108.

The antenna 220, with the wireless communications interface 502, operates to provide wireless communications with the HMI control unit 200, including wireless communication 238.

Such wireless communications range from national and/or international cellular telephone systems to the Internet to point-to-point in-home wireless networks to radio frequency identification (RFID) and/or near field communication (NFC) systems. Each type of communication system is constructed, and hence operates, in accordance with one or more communication standards. For instance, wireless communication systems may operate in accordance with one or more standards including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

The structure of the HMI control unit 200 may also be used as an acceptable architecture of the audio/visual control unit 208, and/or other control units that may be implemented with the vehicle network environment 202. Each control unit may include a communication interface or a wireless communication interface, a processor, and memory that may be communicatively coupled via a data bus. As may be appreciated, other architectures may be implemented, with similar functional capabilities.

The processors for the other control units may be a conventional central processing unit or any other type of device, or multiple devices, capable of manipulating or processing information. As may be appreciated, the processor may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element for the control units 208, for example, may be a single memory device, a plurality of memory devices, and/or embedded circuitry of the processor related to the control unit 208. Such a memory device may be a read-only memory, random access memory, volatile memory, non-volatile memory, static memory, dynamic memory, flash memory, cache memory, and/or any device that stores digital information.

Note that if the processor for each of the control units 208, etc., includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor for each of the control units 208 may implement one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor executes, hard coded and/or operational instructions corresponding to at least some of the steps and/or functions illustrated in FIGS. 1-6 to perform vehicle fuel efficiency operations responsive to an altered vehicle surface and methods described herein.

There is no restriction on the present disclosure operating on any particular hardware arrangement and therefore the basic features herein may be substituted, removed, added to, or otherwise modified for improved hardware and/or firmware arrangements as they may develop.

Figure 6:
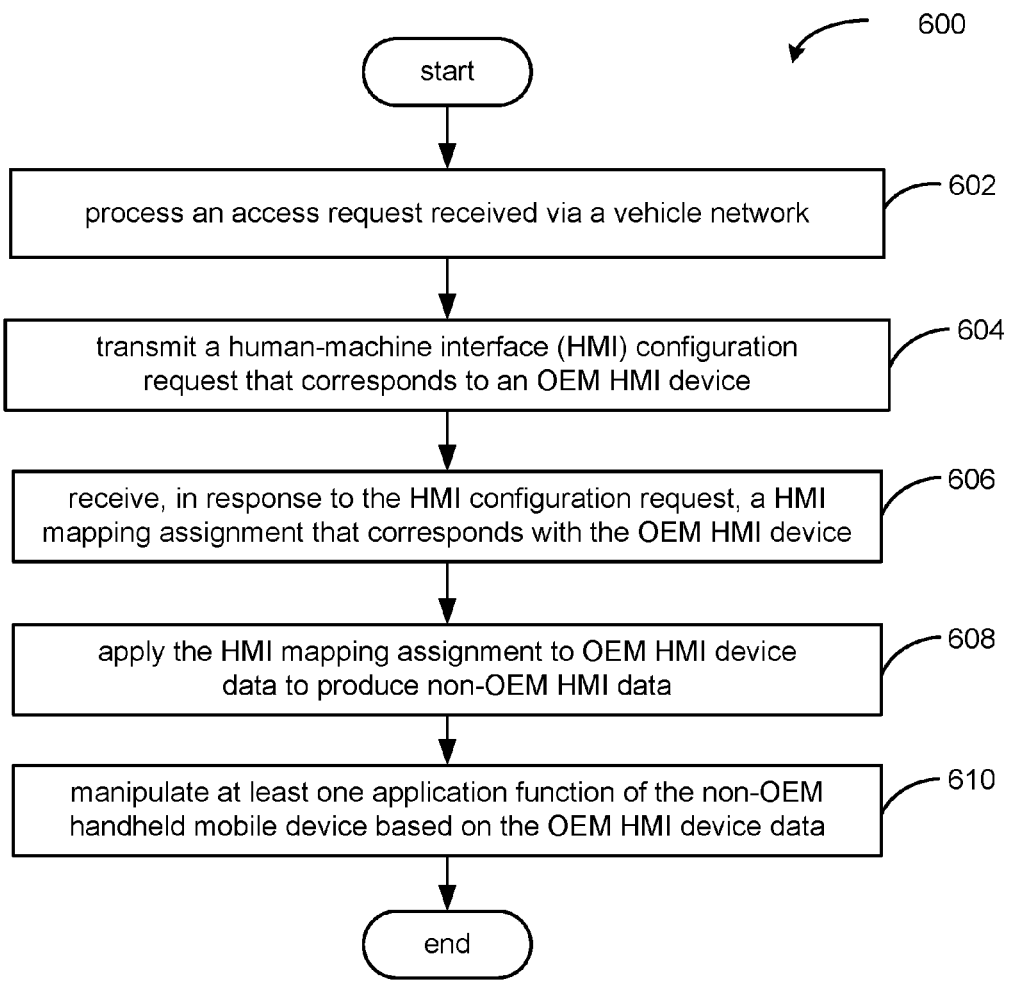
FIG. 6 shows an example process for providing original equipment manufacturer (OEM) human-machine interface (HMI) device operation of a non-OEM handheld mobile device.

FIG. 6 is an example process 600 in a HMI control unit 200 for providing interoperability and/or operation by an original equipment manufacturer (OEM) human-machine interface (HMI) device 104 of a non-OEM handheld mobile device 108 (see, e.g., FIGS. 1-5).

Initially, a non-OEM handheld mobile device docks with a vehicle network 212 (see FIG. 2). The docking may be a wired docking and/or a wireless docking. Examples of wired docking are physical socket and/or pin receivers for the device 108 to the vehicle network 212, such as through a network interface, through various communication protocols, such as USB, Firewire (IEEE 1394), etc. Examples of a wireless docking may be via the antenna 220 of the HMI control unit 200 (see FIG. 2), through 802.11 communications (and variations thereof), Bluetooth, near-field communications (NFC), etc.

Upon sensing the docking of the device 108, the HMI control unit 200 may receive authentication data. The authentication data serves to identify the non-OEM handheld mobile device 108 to the HMI control unit 200. The device 108 may be identified by retrieving mobile device identification information through the wireless and/or wired docking, and/or further by a near field communication (NFC) with the non-OEM handheld mobile device 108. The mobile device identification information may be in the form of a mobile station identification (MSID) data, a mobile identification number (MIN) data, an international mobile subscribe identity (IMSI) data, a manufacturer serial number data, etc.

The HMI control unit 200 receives an access request at operation 602. Upon authentication, the HMI control unit 200 may determines an access authority level to vehicle data network 212, which may be an administrator access authority level (that is, full vehicle network data access, such as for testing at installer and/or vehicle assembly facilities), an owner access authority level (that is, moderate vehicle network data access), and/or a guest access authority level (that is, a low network data access for basic functionality).

As may be appreciated, the access request may include a software license key. The software license key may be provided with an app purchase through the non-OEM handheld mobile device 108 (see FIG. 1). A software license key provides a restricted license to access vehicle data and/or OEM HMI device data. The software license key may operate to provide for OEM HMI device 104 interoperability with a non-OEM handheld mobile device 108. The key may be a combination of the device number (such as identifiers for the non-OEM handheld mobile device 108) and some other information. Because the key is unique to the non-OEM handheld mobile device 108, it may not be transferred and/or used by other mobile devices.

Such access apps may be provided through third-party vendors, which in turn may be authorized resellers by a vehicle manufacture. Such licenses may include a number of seats, or vehicles, that the software license key may access, as well as provide additional services. Examples of additional services may include cloud storage of HMI mapping assignments related to a device 108, such that when the device 108 is relocated to other vehicles, the HMI mapping assignments may be pushed to a vehicle when the non-OEM handheld mobile device deployed.

In operation, the HMI control unit 200 transmits a human-machine interface (HMI) configuration request at operation 606. The HMI configuration request corresponds to the desired OEM HMI device, such as device 104, device 106, and/or devices 120 (see FIG. 1).

As may be appreciated, OEM HMI devices of a vehicle may generally be mapped for accessibility and interoperability with the non-OEM handheld mobile device 108.

The HMI configuration request at operation 604 may provide a graphic user interface (GUI) data for display by the non-OEM handheld mobile device. In this example, the representation of the OEM HMI device 104 may be displayed on the non-OEM handheld mobile device 108, in which device inputs may be learned. For example, a volume control toggle input 116 may be graphically correlated with the volume control toggle input of the device 108, etc.

As may also be appreciated, the non-OEM handheld mobile device 108 may provide an HMI mapping assignment with stored GUI data from earlier configuration activity. The non-OEM handheld mobile device 108 may simply confirm the prior stored GUI data to base interoperability with the OEM HMI device. Also, the HMI control unit 200 may provide with the HMI configuration request default GUI data, which may also be conformed to the non-OEM handheld mobile device 108 for interoperability with the OEM HMI device 104.

Other functions may be mapped to the GUI representation, such as a display scrolling function applied to the volume control toggle inputs 116 of the OEM HMI device 104.

Available mapping assignments are received by the HMI control unit 200 as a HMI mapping assignment at operation 606. In the HMI mapping assignment, functional inputs of the non-OEM handheld mobile device 108 are mapped and/or correlated with the switch inputs of the OEM HMI device 104 (see FIG. 4).

With the applied HMI mapping assignment, the HMI control unit 200 at operation 608 operates to receive OEM HMI device data from the OEM HMI device 104, and produces non-OEM HMI data. At operation 610, the non-OEM HMI data may be provided to the device 108 to manipulate at least one application function of the non-OEM handheld mobile device based on the OEM HMI device data. The HMI control unit 200 may further operate to selectively limit a user input source of the non-OEM handheld mobile device 108.

Figure 7:
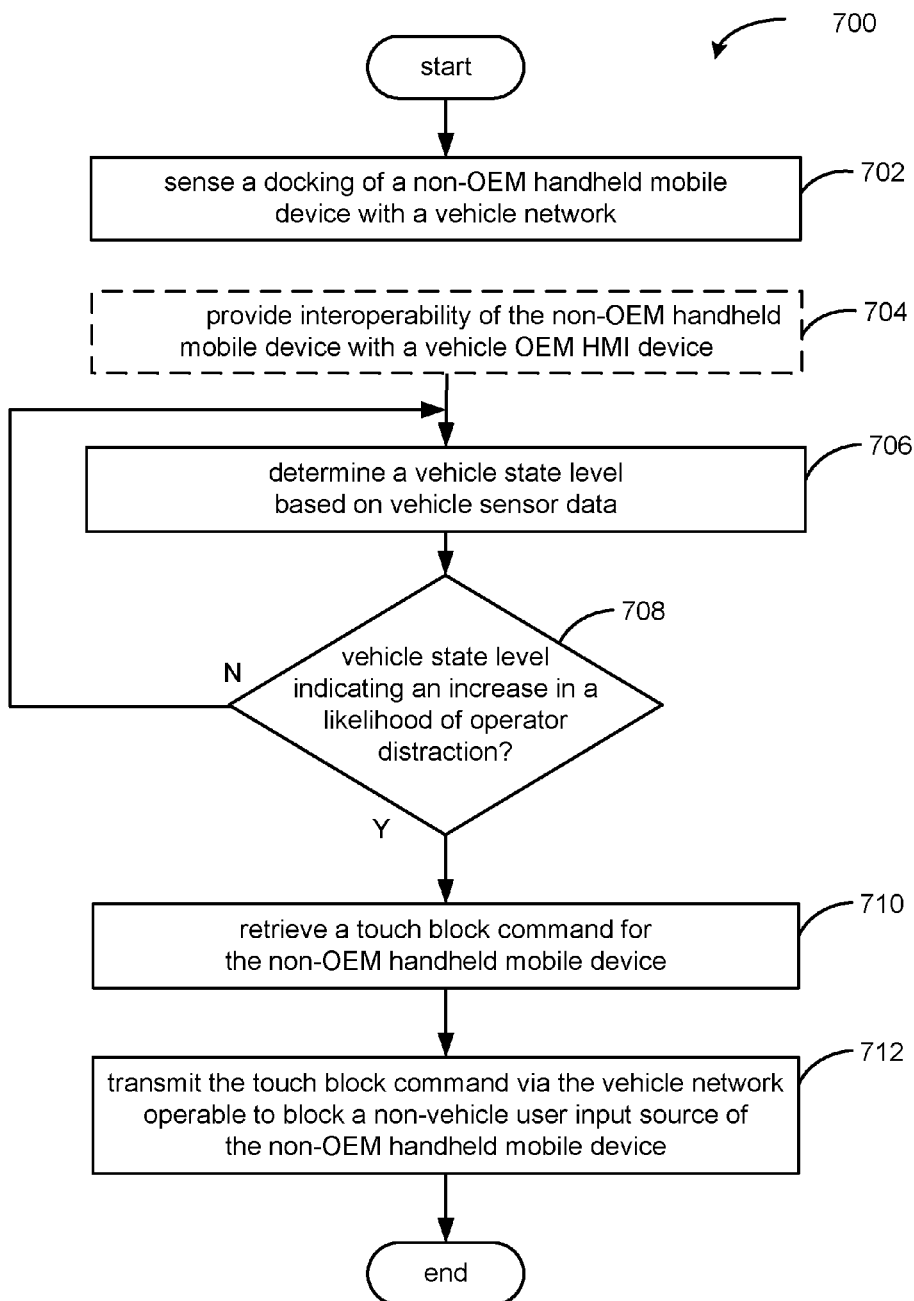
FIG. 7 shows an example process for selectively limiting a user input source of a non-original equipment manufacturer (OEM) handheld mobile device.

Referring to FIG. 7, an example process 700 for selectively limiting a non-vehicle user input source of a non-original equipment manufacturer (OEM) handheld mobile device 108 is shown.

At operation 702, a HMI control unit 200 senses a docking of a non-OEM handheld mobile device 108 with the vehicle network 212 (see FIGS. 1-2).

The non-OEM handheld mobile device may dock via a wired docking, a wireless docking, and/or a combination thereof. Examples of wired docking may include physical socket and/or pin receivers for the device 108 to the vehicle network 212, such as through a network interface, through various communication protocols, such as USB, Firewire (IEEE 1394), etc. Examples of a wireless docking may be via the antenna 220 of the HMI control unit 200 (see FIG. 2), through 802.11 communications (and variations thereof), Bluetooth, near-field communications (NFC), etc.

Upon sensing the docking by the non-OEM handheld mobile device 108, the HMI control unit 200 may provide interoperability of the non-OEM handheld mobile device with a vehicle OEM HMI device at operation 704. The interoperability may exist, as indicated by the dashed lines. In the event it is not present, interoperability may be provided as discussed in detail with reference to FIGS. 3-6.

At operation 706, the HMI control unit 200 determines whether a vehicle state level increases a likelihood of operator distraction. The vehicle state level may be based on vehicle sensor data 266 (see FIG. 2).

The vehicle sensor data 266 may be collected by corresponding sensor devices positioned throughout the vehicle, including proximal sensor devices, and long-range sensor devices, imaging sensor devices, powertrain sensor devices, engine sensor devices, transmission sensor devices, etc.

The vehicle state level may be based on vehicle sensor data 266, which may be collected by corresponding sensor devices positioned throughout the vehicle, including proximal sensor devices, and long-range sensor devices, imaging sensor devices, powertrain sensor devices, engine sensor devices, transmission sensor devices, etc.

The vehicle sensor data 266 may include velocity sensor data 266-1 with weight $W_{266-1}$, acceleration sensor data 266-2 with weight $W_{266-2}$, wheel angle sensor data 266-3 with weight $W_{266-3}$, moisture sensor data 266-4 with weight $W_{266-4}$, transmission shift sensor data 266-5 with weight $W_{266-5}$, sensory input data 266-6 with weight $W_{266-6}$, through sensor data 266-$n$ with weight $W_{266-n}$ As may be appreciated, the weights $W_{266-1}$ through $W_{266-n}$ may indicate a different emphasis for each of the vehicle sensor data (such as a velocity magnitude, or a rate of acceleration, degree of wheel angle, etc.).

For example, when a vehicle is placed into a "drive" (or "reverse") gear, but the vehicle has not started to move, the vehicle status level for the example sensor data 266 would be a weight $W_{266-5}$. For an experienced driver/operator, the vehicle status threshold would not likely be exceeded, though it would for an inexperienced drive/operator. When the vehicle is moving in a straight line, in uncongested traffic, the vehicle status level may be weight $W_{266-5}$, plus weight $W_{266-1}$, and weight $W_{266-2}$. For an experienced driver/operator, the vehicle status threshold would likely be exceeded (as well as for an inexperienced drive/operator).

In determining the vehicle state level, respective singular and/or combinational sensor data may be considered in view of a vehicle state threshold. For example, for an experienced driver, singular transmission shift sensor data 266-5 may not be given much numerical weight (that is, whether the transmission is in "drive" position). In contrast, multiples of sensor data may be considered, such as velocity sensor data 266-1 with a weight $W_{266-1}$, and the magnitude of the velocity with weight $W_{266-1A}$, $W_{266-1B}$, etc., as well as a rate of acceleration by the sensor data 266-2 with a weight $W_{266-2}$, etc. The vehicle state level may be assessed against the vehicle state threshold for determining whether there is an "increase in a likelihood of operator distraction."

When, at operation 708, the vehicle state level indicates an increase in the likelihood of operator distraction, the HMI control unit 200 may operate to block touch command functionality of the non-OEM handheld control unit 108.

As may be appreciated by one of skill in the art, whether the vehicle state level indicates an "increase in a likelihood of operator distraction" may take into consideration that not all drivers/operators share equivalent experience and capability, and need not all be treated equally. Between experienced and less experienced drivers/operators, vehicle statuses may not require the same level of visual, manual and/or cognitive attention. As may be appreciated, the vehicle state level may be assessed with respect to a vehicle state threshold.

For example, a more experienced driver and/or operator may not be likely to be distracted at lower vehicle speeds (as may be indicated by velocity sensor data 266-1 and/or acceleration sensor data 266-2), or at low levels of traffic congestion (as may be indicated by sensory input data 266-6). Accordingly, a vehicle state threshold may provide an experienced vehicle operator with an ability to interface with the touch screen 122 of the non-OEM handheld device 108 while the vehicle is in motion under certain vehicle operations (such as lower speeds, uncongested areas, etc.).

In contrast, a less experienced driver and/or operator (such as a teen driver, for example) may have a higher likelihood to be distracted at a vehicle state level indicating that the vehicle may be in gear. Accordingly, a vehicle state threshold having a lower tolerance may operate to block or lock-out the non-OEM handheld device 108 when a vehicle state level indicates a vehicle transmission is placed in a "drive" position (such has through transmission shift sensor data 266-5). In effect, the vehicle state threshold indicates a greater increase in the likelihood of operator distraction for the less experienced driver.

As may be appreciated, the HMI control unit 200 may lock-out and/or touch block the non-vehicle user input(s) to a docked non-OEM handheld device 108 when the vehicle state level indicates an "increase in the likelihood of operator distraction."

The HMI control unit 200 may at operation 710 retrieve a touch block command for the non-OEM handheld mobile device 108, and transmit at operation 712 the touch block command 264-1 via the vehicle network 212 via non-OEM HMI data 264 (see FIG. 2). The touch block command operates to block the non-vehicle user interfaces of the non-OEM handheld mobile device 108, and to minimize driver/operator activities that may divert the operator's visual, manual, and/or cognitive attention.

A touch block command may operate to execute a touch block application resident with the non-OEM handheld mobile device 108. The touch block application may be loaded by the HMI control unit 200 to the non-OEM handheld mobile device 108. In this regard, the HMI control unit 200 may download and store the touch block application via the wireless communication 238 of the antenna 220, or may have the touch block application pushed to, or updated, via a software load delivered to the vehicle network environment 202.

As may also be appreciated, the HMI control unit 200 may operate to instruct the non-OEM handheld mobile device 108 to access and download a touch block application. As may be further appreciated, a touch block command 264-1 may instruct other control units of the vehicle network environment 202 to recognize none and/or some of user input data 211 produced by the non-OEM handheld mobile device 108, as may be recognized via an applied HMI mapping assignment 316, which is discussed in detail with reference to FIGS. 4-7.

The HMI control unit 200, at operation 710, transmits the touch block command via the vehicle network, wherein the touch block command operates to block a non-vehicle user input source (such as touch screen 122, soft keys 124, and/or volume keys 126) of the non-OEM handheld mobile device 108 (see FIG. 1).

As a result, the remaining inputs available to a vehicle user and/or operator are vehicle user input sources, such as vehicle OEM HMI device 104 and 106, including steering wheel switches/buttons, head unit inputs (for example, buttons/switches, eye-tracking, audible command recognition, etc.)), environmental control knobs/switches 120, etc.

The HMI control unit 200 may retrieve a touch block command for the non-OEM handheld mobile device 108, and transmit the touch block command 264-1 via the vehicle network 212 via a non-OEM HMI data 264. The touch block command operates to block the user interfaces of the non-OEM handheld mobile device 108, and to minimize driver/operator activates that may divert the operator's visual, manual, and/or cognitive attention.

A touch block command 264-1 may operate to execute a touch block application resident with the non-OEM handheld mobile device 108. The touch block application may be loaded by the HMI control unit 200 to the non-OEM handheld mobile device 108. In this regard, the HMI control unit 200 may download a touch block application via the wireless communication 238 of the antenna 220, or may have the touch block application pushed to, or updated, via a software load delivered to the vehicle network environment 202. As may also be appreciated, the HMI control unit 200 may operate to instruct the non-OEM handheld mobile device 108 to access and download a touch block application. As may be further appreciated, the touch block command 264-1 may instruct other control units of the vehicle network environment 202 to recognize none and/or some of user input data 211 produced by the non-OEM handheld mobile device 108, as may be recognized via an applied HMI mapping assignment 316, which is discussed in detail with reference to FIGS. 4-7.

When a vehicle state level no longer indicates an increase in a likelihood of operator distraction, the HMI control unit 200 may issue a rescind touch block command 264-2 operable to cause the non-OEM handheld mobile device 108 to revert to receiving user input via by non-vehicle user input sources such as the touch screen 122, and/or user interfaces 124 and 126 (see FIG. 1).

While particular combinations of various functions and features of the present invention have been expressly described herein, other combinations of these features and functions are possible that are not limited by the particular examples disclosed herein are expressly incorporated within the scope of the present invention.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

Thus, there has been described herein a device and method, as well as several embodiments including several embodiments, for implementing selective limitation of a non-vehicle user input source of a non-original equipment manufacturer (OEM) handheld mobile device.

It will be apparent to those skilled in the art that the disclosed invention may be modified in numerous ways and may assume many embodiments other than the preferred forms specifically set out and described above. Accordingly, it is intended by the appended claims to cover all modifications of the invention that fall within the true spirit and scope of the invention.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method for selectively blocking user input to a non-original equipment manufacturer (OEM) handheld mobile device, the method comprising:
   sensing a docking of the non-OEM handheld mobile device with a vehicle network;
   determining, while in motion, a vehicle state level based on vehicle sensor data;
   when the vehicle state level exceeds a vehicle state threshold to indicate an increase in a likelihood of operator distraction:
      retrieving a touch block command for the non-OEM handheld mobile device; and
      transmitting the touch block command via the vehicle network, wherein the touch block command operates to block the user input via the non-vehicle user input source of the non-OEM handheld mobile device.

2. The method of claim 1, wherein the vehicle sensor data comprising at least one of:
   velocity sensor data;
   acceleration sensor data;
   wheel angle sensor data;
   moisture sensor data; and
   transmission shift sensor data.

3. The method of claim 1, wherein the touch block command operates to limit the user input source to a vehicle OEM human-machine interface (HMI) device.

4. The method of claim 1, wherein the sensing the docking of the non-OEM handheld mobile device with a vehicle network further comprising:
   sensing either of a wireless docking and a wired docking of the non-OEM handheld mobile device with the vehicle network; and
   upon the sensing the either of the wireless docking and the wired docking of the non-OEM handheld mobile device with the vehicle network:
      receiving authentication data to identify the non-OEM handheld mobile device; and
      identifying the non-OEM handheld mobile device.

5. The method of claim 4, wherein the authentication data including at least one of:
   mobile station identification (MS ID) data;
   mobile identification number (MIN) data;
   international mobile subscribe identity (IMSI) data; and
   manufacturer serial number data.

6. The method of claim 4, wherein the authentication data including a software license key.

7. A method for selectively blocking user input to a non-original equipment manufacturer (OEM) handheld mobile device, the method comprising:
   sensing a docking by the non-OEM handheld mobile device with a vehicle network;
   providing interoperability of the non-OEM handheld mobile device with a vehicle OEM HMI device;
   determining, while in motion, a vehicle state level based on vehicle sensor data;
   when the vehicle state level exceeds a vehicle state threshold to indicate an increase in a likelihood of operator distraction:

retrieving a touch block command for the non-OEM handheld mobile device; and transmitting the touch block command via the vehicle network, wherein the touch block command operates to restrict the user input via the non-vehicle user input source to the vehicle OEM HMI device.

8. The method of claim 7, wherein the providing the interoperability of the non-OEM handheld mobile device with the vehicle OEM HMI device further comprising:

processing an access request received via the vehicle network;

transmitting, in response to the access request, a human-machine interface (HMI) configuration request that corresponds to the vehicle OEM HMI device;

receiving, in response to the HMI configuration request, a HMI mapping assignment that corresponds with the vehicle OEM HMI device; and applying the HMI mapping assignment to vehicle OEM HMI device data to produce non-OEM HMI data, wherein the vehicle OEM HMI device data being operable to manipulate at least one application function of the non-OEM handheld mobile device.

9. The method of claim 8, wherein the access request comprising a software license key.

10. The method of claim 9, wherein the receiving authentication data to identify the non-OEM handheld mobile device further comprising:

retrieving mobile device identification information on a near field communication (NFC) with the non-OEM handheld mobile device.

11. The method of claim 7, wherein the sensing the docking by the non-OEM handheld mobile device with the vehicle network further comprising:

sensing either of a wireless docking and a wired docking of the non-OEM handheld mobile device with the vehicle network; and upon the sensing of the either of the wireless docking and the wired docking of the non-OEM handheld mobile device with the vehicle network:

receiving authentication data to identify the non-OEM handheld mobile device; and identifying the non-OEM handheld mobile device.

12. The method of claim 11, wherein the authentication data including at least one of:

mobile station identification (MS ID) data;
mobile identification number (MIN) data;
international mobile subscribe identity (IMSI) data; and
manufacturer serial number data.

13. The method of claim 7, wherein the vehicle sensor data comprising at least one of:

velocity sensor data;
acceleration sensor data;
wheel angle sensor data;
moisture sensor data; and
transmission shift sensor data.

14. A human machine interface (HMI) control unit comprising:

a wireless communication interface to service communication with a vehicle network;

a processor coupled to the wireless communication interface, the processor for controlling operations of the HMI control unit; and a memory coupled to the processor, the memory for storing data and program instructions used by the processor, wherein the processor being configured to execute instructions stored in the memory to:

sense a docking of the non-OEM handheld mobile device with a vehicle network;

determine, while in motion, a vehicle state level based on vehicle sensor data accessed via the vehicle network;

when the vehicle state level exceeds a vehicle state threshold to indicate an increase in a likelihood of operator distraction:

retrieve a touch block command for the non-OEM handheld mobile device; and transmit the touch block command via the vehicle network, wherein the touch block command operates to block user input via a non-vehicle user input source of the non-OEM handheld mobile device.

15. The HMI control unit of claim 14, wherein the vehicle sensor data comprising at least one of:

velocity sensor data;
acceleration sensor data;
wheel angle sensor data;
moisture sensor data; and
transmission shift sensor data.

16. The HMI control unit of claim 14, wherein the touch block command operates to limit the user input source to a vehicle OEM human-machine interface (HMI) device.

17. The HMI control unit of claim 14, wherein the processor being further configured to execute further instructions stored in the memory to sense the docking by the non-OEM handheld mobile device with the vehicle network by:

sensing either of a wireless docking and a wired docking of the non-OEM handheld mobile device with the vehicle network; and upon the sensing the either of the wireless docking and the wired docking of the non-OEM handheld mobile device with the vehicle network:

receiving authentication data to identify the non-OEM handheld mobile device; and identifying the non-OEM handheld mobile device.

18. The HMI control unit of claim 17, wherein the authentication data including at least one of:

mobile station identification (MS ID) data;
mobile identification number (MIN) data;
international mobile subscribe identity (IMSI) data; and
manufacturer serial number data.

19. The HMI control unit of claim 17, wherein the authentication data including a software license key.

20. The HMI control unit of claim 17, wherein the processor being further configured to execute further instructions stored in the memory to receive the authentication data to identify the non-OEM handheld mobile device by:

retrieving mobile device identification information via a near field communication (NFC) with the non-OEM handheld mobile device.

* * * * *